United States Patent
Lillibridge et al.

(10) Patent No.: US 7,979,491 B2
(45) Date of Patent: Jul. 12, 2011

(54) PRODUCING CHUNKS FROM INPUT DATA USING A PLURALITY OF PROCESSING ELEMENTS

(75) Inventors: Mark David Lillibridge, Mountain View, CA (US); Kave Eshghi, Los Altos, CA (US); Graham Perry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 66 days.

(21) Appl. No.: 12/412,821

(22) Filed: Mar. 27, 2009

(65) Prior Publication Data

US 2010/0246709 A1  Sep. 30, 2010

(51) Int. Cl.
G06F 15/16 (2006.01)
G06F 15/173 (2006.01)
(52) U.S. Cl. .................................. 709/205; 709/226
(58) Field of Classification Search .......... 709/203, 709/223, 224, 205, 226
See application file for complete search history.

(56) References Cited

U.S. PATENT DOCUMENTS

| | | | |
|---|---|---|---|
| 5,638,509 A | 6/1997 | Dunphy | |
| 5,990,810 A | 11/1999 | Williams | |
| 6,513,050 B1 | 1/2003 | Williams | |
| 6,727,662 B2 * | 4/2004 | Konopka et al. | 315/209 R |
| 6,839,680 B1 | 1/2005 | Liu | |
| 6,920,507 B1 * | 7/2005 | Kley et al. | 709/248 |
| 6,938,005 B2 | 8/2005 | Iverson | |
| 6,961,009 B2 | 11/2005 | McCanne | |
| 7,047,240 B2 * | 5/2006 | Sato | 1/1 |
| 7,082,548 B2 | 7/2006 | Nakano | |
| 7,185,066 B2 * | 2/2007 | Noble et al. | 709/217 |
| 7,233,938 B2 | 6/2007 | Carus | |
| 7,269,689 B2 | 9/2007 | Eshghi | |
| 7,444,337 B2 * | 10/2008 | Zhou et al. | 1/1 |
| 7,444,349 B1 * | 10/2008 | Ochotta | 1/1 |
| 7,487,228 B1 * | 2/2009 | Preslan et al. | 709/219 |
| 7,562,110 B2 * | 7/2009 | Miloushev et al. | 709/201 |
| 7,581,170 B2 | 8/2009 | Baumgartner | |
| 7,669,101 B2 | 2/2010 | Udell | |
| 7,698,520 B2 | 4/2010 | Minami | |
| 7,738,380 B1 | 6/2010 | Dubrovsky | |
| 7,761,788 B1 | 7/2010 | McKnight | |
| 7,814,043 B2 | 10/2010 | Uchino | |
| 2001/0010070 A1 | 7/2001 | Crockett | |
| 2002/0052769 A1 * | 5/2002 | Navani et al. | 705/7 |
| 2002/0156912 A1 | 10/2002 | Hurst | |
| 2003/0065722 A1 * | 4/2003 | Ieperen | 709/205 |
| 2003/0101449 A1 | 5/2003 | Bentolila | |
| 2003/0140051 A1 | 7/2003 | Fujiwara | |
| 2004/0103147 A1 * | 5/2004 | Flesher et al. | 709/204 |

(Continued)

FOREIGN PATENT DOCUMENTS

WO  2006030326 A1  3/2006

(Continued)

OTHER PUBLICATIONS

Unpublished PCT/US2008/061576 filed Apr. 25, 2008 (59 pages).

(Continued)

*Primary Examiner* — Hussein A Elchanti

(57) ABSTRACT

Input data is divided into multiple segments that are processed by processing elements of a computer. The processing of the segments produces a plurality of tentative sets of chunks. The plurality of tentative sets of chunks are stitched together to produce an output set of chunks.

19 Claims, 4 Drawing Sheets

U.S. PATENT DOCUMENTS

| | | | |
|---|---|---|---|
| 2004/0103413 A1* | 5/2004 | Mandava et al. ............. 718/100 |
| 2004/0162953 A1 | 8/2004 | Yoshida | |
| 2005/0091234 A1 | 4/2005 | Hsu | |
| 2006/0059173 A1 | 3/2006 | Hirsch | |
| 2006/0059207 A1 | 3/2006 | Hirsch | |
| 2006/0293859 A1 | 12/2006 | Pipke | |
| 2007/0220197 A1 | 9/2007 | Lasser | |
| 2007/0250519 A1 | 10/2007 | Fineberg | |
| 2007/0250670 A1 | 10/2007 | Fineberg | |
| 2008/0126176 A1 | 5/2008 | Iguchi | |
| 2009/0112945 A1 | 4/2009 | Camble | |
| 2009/0113167 A1 | 4/2009 | Camble | |
| 2010/0114980 A1 | 5/2010 | Lillibridge | |
| 2010/0198792 A1 | 8/2010 | Camble | |
| 2010/0198832 A1 | 8/2010 | Jones | |
| 2010/0205163 A1 | 8/2010 | Eshghi | |
| 2010/0280997 A1 | 11/2010 | Lillibridge | |
| 2010/0281077 A1 | 11/2010 | Lillibridge | |

FOREIGN PATENT DOCUMENTS

| | | | |
|---|---|---|---|
| WO | 2009030326 A1 | 3/2006 |
| WO | 2006094365 A1 | 9/2006 |
| WO | 2006094366 A1 | 9/2006 |
| WO | 2006094367 A1 | 9/2006 |
| WO | 2007127248 A2 | 11/2007 |
| WO | 2009054828 A1 | 4/2009 |
| WO | 2009054834 | 4/2009 |

OTHER PUBLICATIONS

Unpublished PCT/US2007/022629 filed Oct. 25, 2007 (35 pages).
U.S. Appl. No. 12/258,638, filed Oct. 27, 2008 (45 pages).
U.S. Appl. No. 12/260,024, filed Oct. 28, 2008 (39 pages).
U.S. Appl. No. 12/404,842, filed Mar. 16, 2009 (19 pages).
Fenstermacher et al.; "Mining Client-Side Activity for Personalization" Department of Management Information Systems, Eller College of Business and Public Administration, University of Arizona, Jun. 2002 (8 pages).
Baoyao, Zhou; ""Intelligent Web Usage Mining"" Nanyang Technological University, Division of Information Systems, School of Computer Engineering, 2004 (94 pages).
Baynote Inc.: The Collective Intelligence Platform, Online, http://www.baynote.com/technology/platform/ 2010 (1 page).
Hottolink Inc.; "Recognize" Online, http://www.hottolink.co.jp/english/reconize.html, 2009 (2 pages).
Andrejko et al.: User Characteristics Acquisition from Logs with Semantics, Slovak University of Technology in Bratislava, 2007 (8 pages).
Hongjun Lu et al: Extending a Web Browser with Client-Side Mining, Hong Kong University of Science and Technology Department of Computer Science, Clear Water Bay, Kowloon, Hong Kong, China, 2003 (12 pages).
Shankar et al.; ""Personalized Web Search Based on Client Side Ontology"", CS 498: B.Tech Project,10. IIT Kanpur, India 2010 (9 pages).
Sendhikumar et al.; "Personalized ontology for web search personalization" Anna University, Chennai, India, 2008 (7 pages).
Shahabi et al.; "Yoda An Accurate and Scalable Web based Recommendation System?" University of SouthernCalifornia, Los Angeles, Sep. 2001 (14 pages).
Why Wubat? Website User Behavior & Analysis Tool, Wubat, Online, http://www.wubat.com/ (3 pages).
Claypool et al.; "Implicit Interest Indicators", Worcester Polytechnic Institute, Worcester, Computer Science Department Worcester Polytechnic Institute Worcester, MA 01609, USA., 2001 (8 pages).
Shahabi et al.; A Framework for Efficient and Anonymous Web Usage Mining Based on Client-Side Tracking, University of Southern California, Los Angeles, 2002 (48 pages).
Clattertrap; Online http://www.clattertrap.com; Jul. 20, 2010 (1 page).
HSNW: SRI defense technology spawns civilian application: published Jun. 29, 2010 (2 pages).
Anthony Ha: Facebook investor backs Chattertrap, a personal assistant for content, Jun. 28, 2010 (6 pages).
U.S. Appl. No. 11/411,467, Non-Final Rejection dated Jan. 27, 2009 (pp. 1-9 and attachments).
U.S. Appl. No. 11/411,467, Final Rejection dated Aug. 11, 2009 (pp. 1-11 and attachment).
U.S. Appl. No. 11/411,467, Examiner's Answer dated May 11, 2010 (pp. 1-11 and attachment).
European Patent Office, International Appl. No. PCT/US2007/010015, Search Report and Written Opinion dated Jan. 2, 2008 (12 pages).
European Patent Office, EP 07756010.0, Examination Report dated Feb. 20, 2009 (4 pages).
Muthitacharoen Athicha, et al., "A Low-Bandwidth Network File System," Proceedings of the 18th ACM Symposium on Operating Systems Principles (SOSP '01), Oct. 2001.
L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.
You L. L. et al., "Deep Store An Archival Storage System Architecture" Data Engineering, 2005. ICDE 2005. Proceedings. 21st. intl Conf on Tokyo, Japan, Apr. 5-8, 2005, pp. 12.
Korean Intellectual Property Office, International Appl. No. PCT/US2007/0022586, Search Report and Written Opinion dated Jul. 23, 2008 (pp. 1-12).
Korean International Property Office, PCT/US2008/061576 Search Report dated Jan. 23, 2009 (2 pages).
Eshghi et al., "Jumbo Store: Providing Efficient Incremental Upload and Versioning for a Utility Rendering Service," 2007 (16 pages).
U.S. Appl. No. 10/870,783, Non-Final Rejection dated Dec. 15, 2006, pp. 1-4 and attachments.
U.S. Appl. No. 10/870,783, Notice of Allowance dated Jun. 13, 2007 (7 pages).
UK Intellectual Property Office Search Report, GB 0511574.6 dated Oct. 19, 2005 (1 page).
UK Intellectual Property Office, Examination Report, GB 0511574.6 dated Jul. 19, 2007 (6 pages).
Translation of Japanese Office Action, JP 2005-173488, Notice of Rejection dated Aug. 5, 2008 (8 pages).
Translation of German Office Action dated Jul. 7, 2006, DE 10 2005023128.4-53 (3 pages).
Translation of German Office Action dated Feb. 7, 2008, DE 10 2005023128.4-53 (6 pages).
Brin, Sergey, et al., "Copy Detection Mechanisms for Digital Documents", Department of Computer Science, Stanford University, Oct. 31, 1994, p. 1-21.
Manber, Udi, "Finding Similar Files in a Large File System," Department of Computer Science, University of Arizona, TR 93-33, Oct. 1993, (11 pages).
Rabin, M.O., "Fingerprinting By Random Polynomials," Technical Report, Center for Research in Computing Technology, Harvard University, 1981, Report TR-15-81 (14 pages).
Korean Intellectual Property Action, International Appl. No. PCT/US2007/022629 Search Report dated Jul. 24, 2008 (2 pages).
Korean Intellectual Property Office, International Appl. No. PCT/US2007/022585 Search Report dated Jul. 15, 2008 (2 pages).
U.S. Appl. No. 12/404,842, Non-Final Rejection dated Oct. 19, 2010, pp. 1-8 and attachments.

* cited by examiner

PRODUCING CHUNKS FROM INPUT DATA USING A PLURALITY OF PROCESSING ELEMENTS

BACKGROUND

As the amount of information to be stored and transmitted by computer systems or other electronic devices has dramatically increased, techniques have been developed to allow for more efficient data storage and processing. In some cases, chunking algorithms have been used to achieve improved efficiency and speed. Chunking algorithms partition one or more data objects into non-overlapping chunks. By dividing one or more data objects into chunks, a system is able to identify chunks that are shared by more than one data object or occur multiple times in the same data object, such that these shared chunks are stored just once to avoid or reduce the likelihood of storing duplicate data.

One type of chunking algorithm is a landmark chunking algorithm, which performs partitioning of one or more data objects by first locating landmarks present in the one or more data objects. The landmarks are short predefined patterns of data whose locations are used in determining chunk boundaries. By convention, each landmark is considered to occur at a single position, often the position immediately following that landmark's pattern.

The landmark chunking algorithm then determines chunk boundaries from the landmark locations. The simplest landmark chunking algorithm places a chunk boundary at each landmark. More complicated landmark chunking algorithms take into account the distance between landmarks in order to, for example, avoid too small or too large chunks. Note that for such algorithms, not all landmarks will be designated chunk boundaries and not all chunk boundaries are located at landmark positions. In one example, a landmark may be considered to be located at any position in a data stream immediately following a new line character (the pattern). Landmark chunking a text file using the new line character as the landmark definition would partition the text file into a sequence of chunks, where lines of the text file may be separate chunks. Landmark definitions that are actually used in practice tend to be more complicated to enable proper handling of file types other than text files. For example, a position in a data stream can be defined as a landmark location if the immediately preceding 48 bytes of data has a particular calculated value, such as a Rabin fingerprint equal to −1 mod a predefined number related to the average desired chunk size.

A benefit of landmark chunking algorithms is that local changes are likely to disturb only a small number of chunks. For example, in a text file, adding a word to one line in the middle of the document only disturbs that line (chunk). In contrast, if a text file were to be simply divided into fixed-size 80-character records, an added word in the text file would cause every record after the added word to be changed, which leads to increased computer processing.

Conventional landmark chunking algorithms that are applied to large input data can be very computing-intensive. For example, in the data backup or archiving context, relatively large amounts of data are processed during the backup or archiving operation. If the landmark chunking algorithm is not performed efficiently, then the backup or archiving operation may take a long time to complete.

BRIEF DESCRIPTION OF THE DRAWINGS

Some embodiments of the invention are described with respect to the following figures.

DETAILED DESCRIPTION

Figure 1:
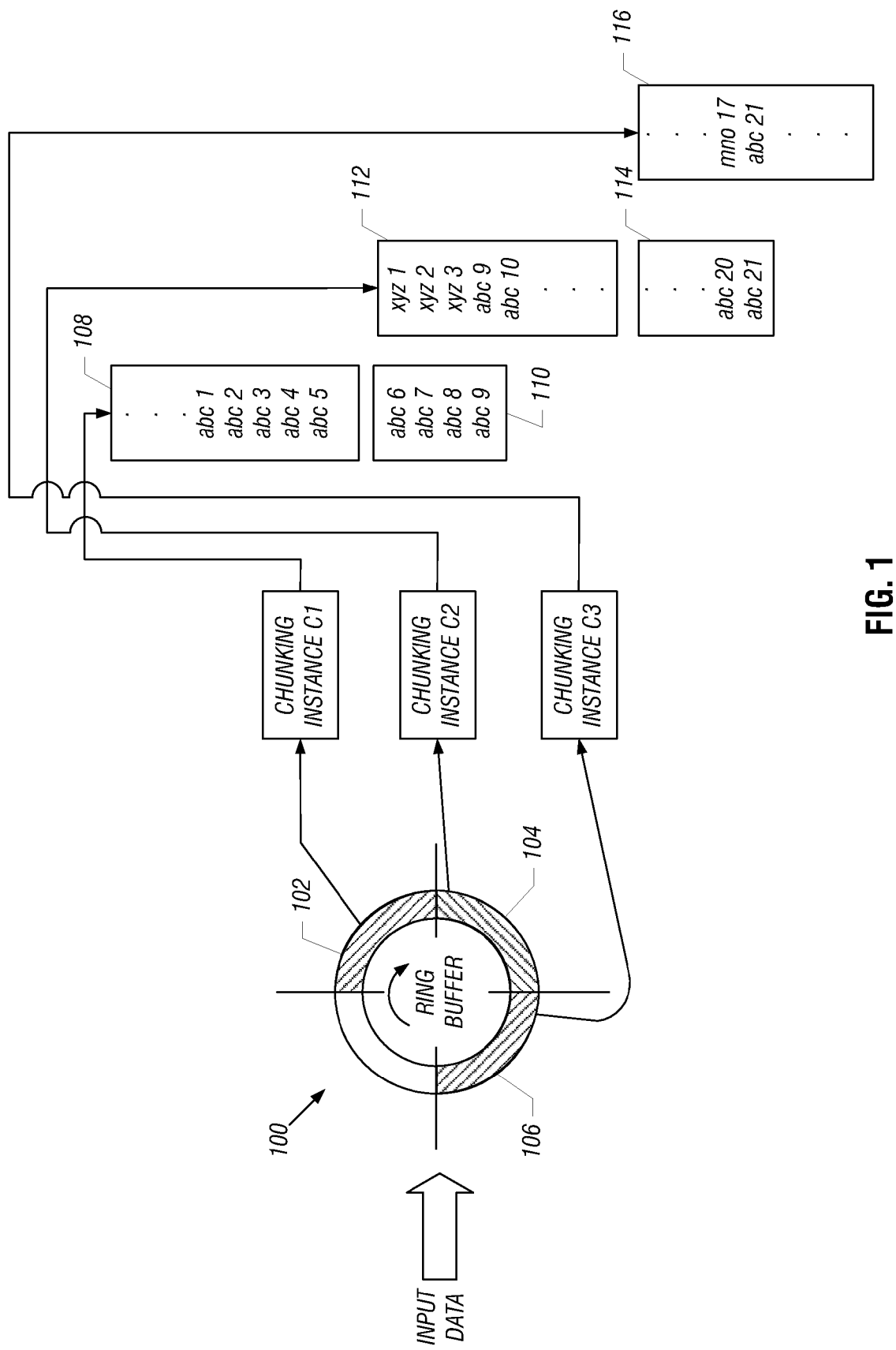
FIG. 1 is a schematic diagram illustrating the identification of chunks in segments of input data by multiple chunking instances, in accordance with an embodiment.

In accordance with some embodiments, multiple processing elements are used to produce chunks from input data. The input data is first divided into segments, where the segments are processed, in parallel, by the multiple processing elements for increased computational speed. Each processing element processes content of at least one segment to identify chunks within that segment.

In general, the multiple processing elements produce corresponding tentative sets of chunks. A "tentative" set of chunks refers to a group or collection of one or more chunks that is produced by at least one processing element from at least one segment of the input data; this tentative set of chunks may or may not contain the final chunks that are ultimately used.

In one embodiment, each segment is processed by a different processing element. Each such processing element runs a sequential chunking algorithm on its respective segment to produce a tentative set of chunks for that segment. The processing element may start from the beginning of its segment, treating that point as a chunk boundary. This processing may be done in parallel, with every segment being chunked simultaneously.

The processing element for a segment may examine only the data for its segment during this step, treating the end of that segment as a tentative chunk boundary. Alternatively, it may examine just enough of any following segment to determine the end of the last chunk starting in its segment.

The tentative sets of chunks are stitched together to produce an output set of chunks, which are considered the identified set of chunks of the input data. Stitching together the tentative sets of chunks may involve additional processing to ensure that chunks do not overlap and that the output set of chunks covers the entire input data. It may also involve additional processing to produce a set of chunks with as many chunks in common as possible with the set of chunks that sequentially chunking the entire input data would have produced. Some of the tentative chunks may be replaced with new chunks in this process.

It is desirable to produce as few chunks as possible that are different from the chunks that a fully sequential chunking algorithm applied on the entirety of the input data would have produced, since every different chunk reduces the degree of deduplication achieved (in other words, if the same data is chunked different ways each time the data is seen, no duplicate chunks will be detected and thus the data will not be compressed).

In one embodiment, stitching together multiple tentative sets of chunks produced by respective processing elements to produce the output set of chunks can include creating a combined set of chunks by combining the multiple tentative sets of chunks. In combining the tentative sets of chunks, two adjacent or overlapping chunks from different tentative sets of chunks can be merged into a single chunk if a size of a resulting chunk from the merging would not exceed a predetermined maximum chunk size. If two overlapping chunks when combined would exceed a predetermined maximum chunk size, then one of the chunks can be shortened by using a chunk boundary of the other chunk so that they are now adjacent rather than overlapping.

In some embodiments, stitching multiple tentative sets of chunks together to produce the output set of chunks includes extending a first tentative set of chunks until a synchronization point is reached between the first tentative set of chunks and a second tentative set of chunks. The synchronization point can be a common chunk boundary shared by the first and second tentative sets, or possibly alternatively, the synchronization point can be the first chunk boundary of the second tentative set reached after a timeout has occurred. In the latter case, the synchronization point may be considered a chunk boundary for the last chunk in the extended first tentative set of chunks.

Extending the first tentative set of chunks may be done by resuming chunking sequentially where it was left off when producing the first tentative set of chunks. Chunking may continue into the next segment and then possibly into succeeding segments.

Normally, the second tentative set belongs to the segment (referred to as "second segment") immediately following that corresponding to the first tentative set; however, if synchronization is not reached between the first extended tentative set and the second tentative set, extension of the first tentative set of chunks continues and synchronization is attempted with the tentative set corresponding to the next segment (following the second segment). If synchronization fails with that tentative set as well, the process continues with additional segments until the last segment is reached. At that point, synchronization will always occur because the end of the input data is always a (tentative) chunk boundary.

The extended first tentative set of chunks is based on at least first and second ones of the segments of input data. The second tentative set is based on at least the second segment. In this scenario, stitching the multiple tentative sets of chunks further includes harmonizing inconsistencies in chunks identified by the first extended tentative set and the second tentative set.

In one implementation, a first of the processing elements processes the first segment, and a second of the processing elements processes the second segment. When extending the first tentative set of chunks, the first processing element further processes at least part of the second segment. In another implementation, the first processing element processes the first segment, and the second processing element processes the second segment without using information from the first segment. When extending the first tentative set of chunks, a third of the processing elements processes at least part of the second segment using information from the first segment. Note that this "third" processing element can be one of the first or second processing element, or can be another processing element.

Once a synchronization point has been found, the extended first tentative set of chunks and the second tentative set of chunks may be combined to form a new tentative set of chunks by taking chunks before the synchronization point from the extended first tentative set of chunks and chunks from after the synchronization point from the second tentative set of chunks. If synchronization has not been interrupted by a timeout, this will produce the same set of chunks as sequentially chunking the underlying segments would have produced. A timeout mechanism or other method of limiting the amount of time synchronization can take may be implemented in order to ensure that chunking proceeds at a target minimum speed.

This process of extending a first tentative set of chunks until it synchronizes with a second tentative set of chunks and then combining the resulting tentative chunks together as above to produce a tentative set of chunks replacing the first and second tentative set of chunks (and possibly others if synchronization involved traversing multiple segments) may be repeated until a single tentative set of chunks covers the entire input data. This single tentative set may be used as the output set of chunks.

Alternatively, many tentative sets of chunks can be extended in parallel by different processing elements until respective synchronization points are reached and then the resulting extended tentative sets of chunks can be combined as above.

A "chunk" refers to an element of a partition of input data, where the input data can be in the form of a file or other data object. As examples, the input data can be a document (such as a document produced or edited by a software application), an image file, a video file, an audio file, a tape image, or any other collection or sequence of data. A "boundary" or "chunk boundary" refers to a position within the input data that defines an endpoint of a chunk. Two successive boundaries define the two endpoints of a corresponding chunk.

The chunking algorithm that is used to perform chunking of input data can be a landmark chunking algorithm, in which the landmarks identified by the landmark chunking algorithm are used to derive boundaries that define corresponding chunks. Landmarks are defined based on local content of the input data. A landmark refers to a short sequence of bytes found within the input data that satisfies predetermined criteria. An example of the predetermined criteria includes applying a function to a portion of the input data—the short sequence of bytes—and determining whether the output of the function has some relation with respect to a threshold. Another example of the predetermined criteria includes determining whether a portion of the input data has certain characteristics (e.g., the input data portion has a certain character, is a new line, is a section break, etc.). The predetermined criteria may deal only with the intrinsic qualities of the byte sequence itself rather than extrinsic qualities like the location of the byte sequence or the data around the byte sequence. The locations of landmarks are used to derive chunk boundaries that are the endpoints of chunks of the input data.

In one example, one technique of locating landmarks is to use a sliding window algorithm where, for each position within the input data, a fingerprint is computed for the sequence of data within the respective sliding window. The sliding window contains bytes within the input data that precedes the position of the input data being considered. If the computed fingerprint satisfies a particular criterion, the position is designated as a landmark. In one specific example, a position in the input file is a landmark if the immediately preceding 48 bytes (sliding window) have a Rabin fingerprint equal to −1 mod a predefined number related to the average desired chunk size. In other implementations, other fingerprints or other values computed from other functions (e.g., hash functions) can be computed based on the content of the input data.

Based on the identified landmarks, chunk boundaries can be derived using a landmark chunking algorithm. In some algorithms, to improve performance of chunking, minimum and maximum chunk sizes can be set. Thus, any landmark that is less than a minimum chunk size following the previous chunk boundary is disregarded, since using such landmark as a chunk boundary would result in a chunk that would be considered too small.

Moreover, chunk sizes may not be allowed to exceed a maximum chunk size. If the chunking algorithm detects that no landmark has been detected in a region of the input data that starts at the previous chunk boundary plus any minimum chunk size and ends at a position that corresponds to the maximum chunk size, then the position corresponding to the maximum chunk size from the previous chunk boundary can be used as the next chunk boundary, in one implementation.

In an alternative implementation, the concept of primary and secondary landmarks can be used. Primary and secondary landmarks are computed based on the same input data value (such as the value of input data within a sliding window) but using different functions—the concept here is that a secondary landmark is easier to detect than a primary landmark such that a secondary landmark would be more likely to be present within an input data region than a primary landmark. If a primary landmark is found in a region of input data that is between [previous chunk boundary+minimum chunk size] and [previous chunk boundary+maximum chunk size], then the first such primary landmark would be used as the next chunk boundary. The position [previous chunk boundary+minimum chunk size] refers to a position that is equal to the position of the previous chunk boundary plus the minimum chunk size. The position [previous chunk boundary+maximum chunk size] refers to a position that is equal to the position of the previous chunk boundary plus the maximum chunk size.

If a primary landmark is not found in the region between [previous chunk boundary+minimum chunk size] and [previous chunk boundary+maximum chunk size], then the chunking algorithm determines if a secondary landmark is present in the region—if so, then the last such secondary landmark is used as the chunk boundary. If no secondary landmark is found in the region, then the position [previous chunk boundary+maximum chunk size] is used as the next chunk boundary.

Details regarding the above chunking algorithm in which minimum and maximum chunk sizes are set and in which primary and secondary landmarks are generated are described further in U.S. Pat. No. 7,269,689. In other embodiments, other chunking algorithms for determining chunk boundaries can be employed.

In the ensuing discussion, reference is made to an embodiment in which when a processing element P has completed the processing of its assigned segment (and has produced its respective tentative set of chunks), that processing element can continue into a subsequent segment (which is assigned to another processing element) to extend P's tentative set of chunks. However, similar techniques can be applied in the alternative embodiment in which when a first processing element has completed processing a first segment of input data to produce a first tentative set, the first tentative set can be extended by another processing element processing at least part of a second segment of input data, where processing of at least part of the second segment by the another processing element to extend the first tentative set takes into account information (content) of the first segment. Note that a second segment also produces a second tentative set based on the second segment that does not take into account information (content) of the first segment.

In either of the two embodiments noted above, the extended first tentative set of chunks and the second tentative set of chunks are combined into a new set without overlapping chunks (resulting in harmonization of the first and second tentative sets).

As a result of a processing element continuing to process at least part of a subsequent segment after the processing element has completed its originally assigned segment of input data, the subsequent segment of the input data may be processed by two processing elements (a first processing element and a second processing element). It is likely that at least in an initial part of this subsequent segment, the two processing elements will identify different chunks (with different chunk boundaries). The reason for the possible identification of different chunks in this initial part of the subsequent segment by the two different processing elements is that the first processing element (which is assigned a first segment) may begin chunking the second segment having already formed a partial chunk from the data at the end of the first segment. On the other hand, the second processing element, being unaware of the content of the first segment when the second processing element begins processing of the second segment, always starts its first chunk at the beginning of the second segment. Since the second processing element is unaware of the content of the first segment, a chunk boundary identified by the second processing element in the second segment may differ from a chunk boundary identified by the first processing element.

In each segment that is processed by multiple processing elements, if inconsistent chunk boundaries are derived, techniques according to some embodiments discard or alter chunks in order to produce a non-overlapping set of chunks that cover the given segments. This process may be performed based on synchronization between pairs of processing elements that are processing the same segment, where synchronization may occur at the point in the segment where the two processing elements have identified the same chunk boundary. Alternatively, the synchronization may occur at the next chunk boundary of the second tentative set of chunks if a timeout occurs. In this way, a first tentative set of chunks produced by the first processing element (that has completed its assigned input data segment and have continued into the subsequent input data segment) is extended until the extended first tentative set of chunks shares a chunk boundary with a second tentative set of chunks (produced by the second processing element) or until a timeout occurs.

FIG. 1 schematically illustrates the processing of input data to produce chunks by multiple processing elements. The multiple processing elements to process respective segments to partition the input data in parallel into chunks can be distinct processors that are provided in one or more computers or other types of electronic devices (e.g., storage devices, communications devices, etc.). Alternatively, the multiple processing elements can be separate cores of a multi-core processor. The multiple cores of a processor are independent cores that are packaged into a single integrated circuit, such as a single die or multiple dies that are packaged together. Each core of the processor is able to independently perform execution of a respective set of instructions, such as instructions of distinct threads or processes.

Instances of a chunking software module are executable on the respective processing elements to perform the chunking algorithm. In FIG. 1, the multiple instances of the chunking software module are represented as chunking instances C1, C2, and C3. The input data to be chunked is received by an input storage device, which in one exemplary embodiment is a ring buffer 100. In alternative implementations, other types of input storage devices can be used.

As shown in FIG. 1, the input data is divided into three segments 102, 104, and 106, for processing by respective chunking instances C1, C2, and C3. The segments 102, 104, and 106 can be of the same size or of different sizes (such as due to the multiple processing elements having different performance characteristics). The chunking instance C1 processes the input data segment 102 to produce tentative chunks defined by chunk boundaries . . . , abc1, abc2, abc3, abc4, and abc5. Each successive pair of chunk boundaries defines a corresponding tentative chunk. In FIG. 1, the chunk boundaries . . . , abc1, abc2, abc3, abc4, and abc5 are listed in a chunk list (which is a type of tentative set mentioned above) 108.

Note that concurrently with the chunking instance C1 processing input data segment 102, the chunking instance C2 processes the input data segment 104, and the chunking instance C3 processes the input data segment 106. Once the chunking instance C1 has reached the end of the input data segment 102 (and produced tentative chunks as identified by chunk boundaries in the chunk list 108), the chunking instance C1 continues to process the next input data segment 104 (which is also being processed, or has been processed, by the chunking instance C2). In continuing to process the next input data segment 104, the chunking instance C1 identifies the following tentative chunk boundaries: abc6, abc7, abc8, and abc9 (listed in a chunk list 110). The chunk list 110 is considered to extend the chunk list 108 by following it. The concatenation of these two lists is thus C1's extended tentative set of chunks at this point.

However, the tentative chunks identified by the chunking instance C2 (which was assigned to the input data segment 104) differ somewhat from the chunks identified by the chunking instance C1 for the start of input data segment 104. The tentative chunk boundaries identified by the chunking instance C2 are xyz1, xyz2, xyz3, abc9, abc10, and so forth (which are listed in a chunk list 112). The tentative chunk boundaries xyz1, xyz2, and xyz3 in the initial part of the second input data segment 104 as identified by the chunking instance C2 are different from the tentative chunk boundaries abc6, abc7, and abc8 identified by the chunking instance C1 in the second input data segment 104. However, both chunking instances C1 and C2 identified the same tentative chunk boundary abc9 in the input data segment 104. This common chunk boundary identified by the both the chunking instances C1 and C2 in processing the same input data segment is considered a synchronization point, which is indicative of the first common chunk boundary identified by the chunking instance C1. All chunk boundaries identified by chunking instance C2 after chunk boundary abc9 will be in common. Also, when the chunking instance C1 detects that a tentative chunk boundary that chunking instance C1 has identified matches a tentative chunk boundary produced by the chunking instance C2 assigned the input data segment 104, the chunking instance C1 stops further processing of the input data segment 104, since a synchronization point has been reached.

In this example, the tentative chunk list 108 is considered to have been extended by the tentative chunk list 110 until a synchronization point is reached with tentative chunks identified by the second processing element. In the tentative chunk list 112 provided by the second processing element, the tentative chunk boundaries xyz1, xyz2, and xyz3 will be disregarded at harmonization time. Collectively, the chunk list 108 and 110 make up an extended first tentative set of chunks, whereas the chunk list 112 makes up a second tentative set of chunks.

When the chunking instance C2 reaches the end of the input data segment 104, it continues into the next input data segment 106. Note that chunking instance C3 has already started (or has completed) processing the input data segment 106. A similar process as described above is performed to find a synchronization point in the tentative chunk boundaries identified by chunking instances C2 and C3. The tentative chunk boundaries identified by the chunking instance C3 for segment 106 are in tentative chunk list 116, while the tentative chunk boundaries identified by the chunking instance C2 for segment 106 are in tentative chunk list 114.

The final set of output chunks for this example will have boundaries . . . , abc1, abc2, abc3, abc4, abc5, abc6, abc7, ab8, abc9, abc10, . . . , abc20, abc21, . . . . Here, harmonization has been accomplished by disregarding boundaries xyz1, xyz2, xyz3 from tentative chunk list 112 and boundaries . . . , mno17 from tentative chunk list 116. C1 synchronized with C2 at abc9 and C2 synchronized with C3 at abc21.

In rare cases, it may be possible that synchronization is not achieved in a particular segment processed by multiple chunking instances. In those scenarios, the tentative chunk boundaries identified by the least significant chunking instance (the chunking instance that started processing with the earliest segment before that particular segment) are treated as the final chunk boundaries in that particular segment. In the example of FIG. 1, chunking instance C1 is a "less significant" chunking instance than chunking instance C2.

FIG. 1 depicts an embodiment in which the first chunking instance C1 continues to process the second input data segment 104 (to produce list 110) after the first chunking instance C1 has finished processing the first input data segment 102 (to produce list 108).

In a different embodiment, as discussed further above, instead of the first chunking instance C1 continuing to process the second segment 104 after completing processing of the first segment 102, the chunking instance C2 processes the second segment 104 to produce both lists 110 and 112. In producing list 110, the chunking instance C2 may take into account the last tentative chunk boundary of tentative chunk list 108 (abc5) as well as the content of segment 102 after that point. However, in producing the list 112, the chunking instance C2 does not take into account the content of the first segment 102.

Figure 2:
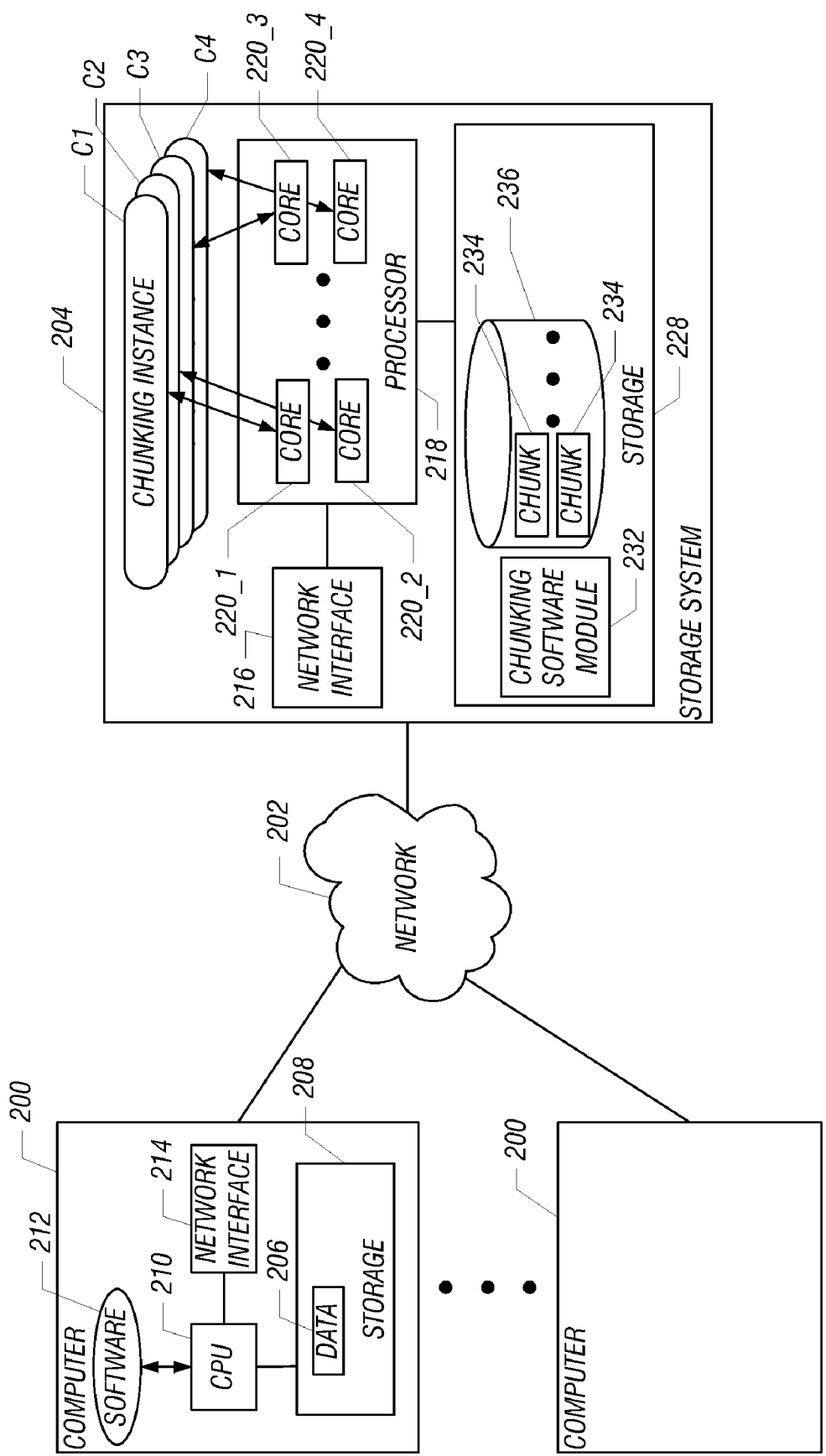
FIG. 2 is a block diagram of an exemplary network arrangement in which an embodiment of the invention is incorporated.

FIG. 2 illustrates an exemplary arrangement that includes computers 200 connected over a network 202 to a storage system 204. In one example, the storage system can be a backup storage system or an archiving storage system to back up or archive data 206 contained in respective computers 200. In FIG. 2, components of one of the computers 200 are depicted, with the other computers containing the same or similar components.

Although multiple computers 200 are shown, it is noted that a single computer 200 can be used in another implementation.

Each computer 200 includes a storage 208 (e.g., disk-based storage, integrated circuit storage, etc.) to store the data 206. A central processing unit (or multiple central processing units) 210 is (are) connected to the storage 208, and software 212 (application software, operating system software, etc.) is executable on the CPU(s) 210.

A network interface 214 is provided in each computer 200 to communicate the data 206 over the network 202 to the storage system 204. The storage system 204 accepts the data 206 from the multiple computers 200 as input data that is subjected to a landmark chunking algorithm, in accordance with some embodiments. Although the chunking algorithm according to some embodiments is performed at the storage system 204 in one specific example, it is noted that the chunking algorithm can alternatively be performed elsewhere in the network arrangement depicted in FIG. 2, such as in any one of the computers 200. The landmark chunking algorithm according to some embodiments is advantageously performed in the storage system 204 since the storage system 204 is used to store data associated with multiple computers 200, such that the amount data that is processed at the storage system 204 can be relatively large.

Input data from the computers 200 communicated over the network 202 is received by a network interface 216 in the storage system 204. The network interface 216 is in turn connected to a processor 218, which has multiple cores 220_1, 220_2, 220_3, and 220_4 (although four cores are depicted in FIG. 2, other embodiments can employ different numbers of cores in the processor 218).

Although the storage system 204 is depicted as including a multi-core processor 218, it is noted that in an alternative embodiment, multiple distinct processors 218 can be provided in the storage system 204, where each of such distinct processors 218 can be a single-core or multi-core processor.

In accordance with some embodiments, multiple chunking instances C1, C2, C3, and C4 are executable on corresponding cores 220_1, 220_2, 220_3, and 220_4 of the processor 118 to identify chunk boundaries in corresponding segments of the input data. The chunking instances C1 to C4 can be multiple threads or processes that are spawned from a chunking software module 232 stored in a storage 228 in the storage system 204. The multiple chunking instances C1 to C4 spawned from the chunking software module 232 are executed in parallel on the cores 220_1 to 220_4 of the processor 218 to process respective segments of the input data. Chunks determined by the chunking instances C1 to C4 are stored as chunks 234 in a database or other storage structure of the storage 228. A benefit of chunking input data into chunks is that deduplication of data can be applied. Data objects may share common data portions. By partitioning data objects into chunks, the chunks corresponding to the common data portions can be stored just once to avoid storing duplicate data, which is wasteful of storage resources.

Figure 3:
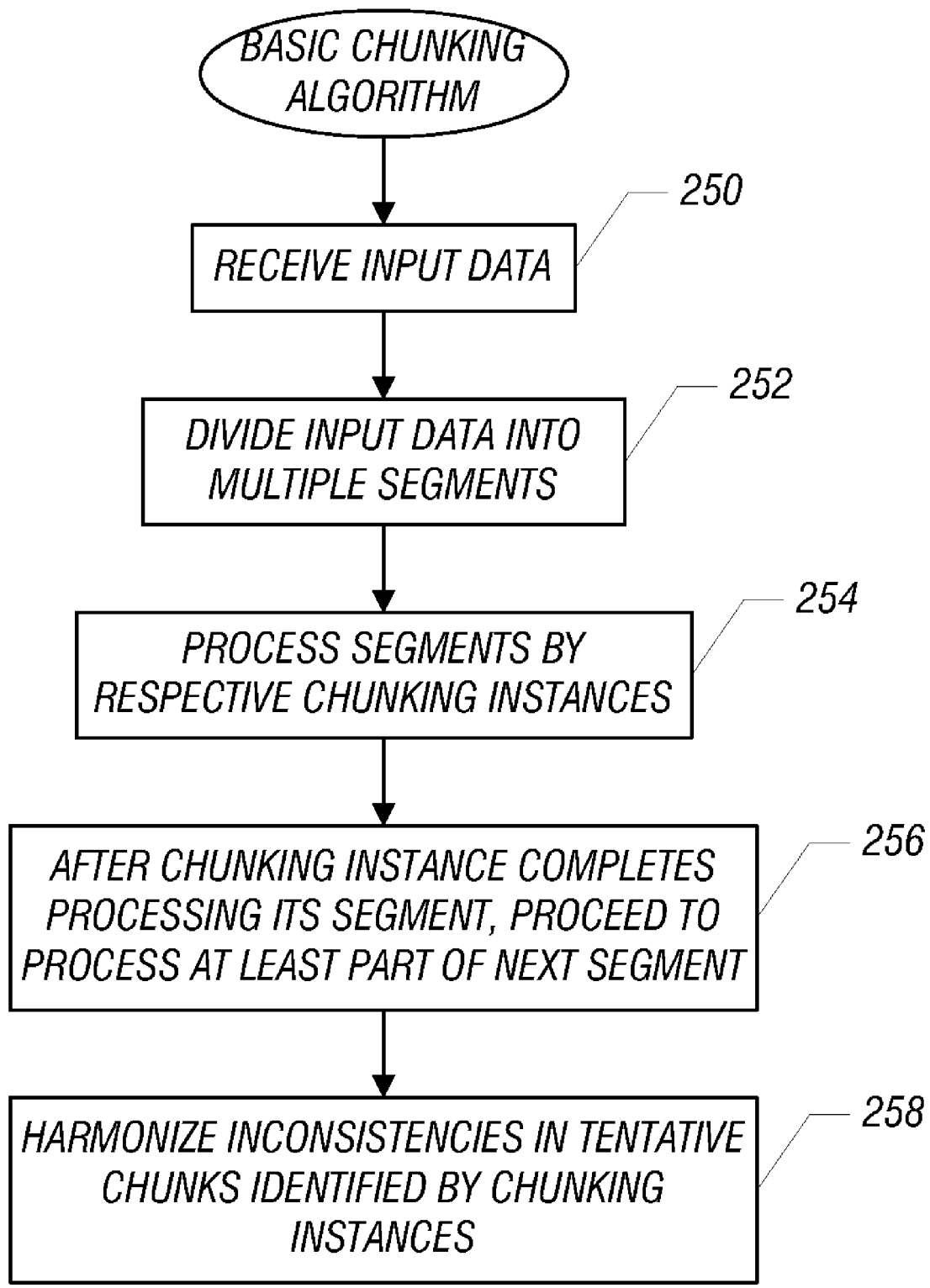
FIG. 3 is a flow diagram of a process of identifying chunks using multiple processing elements, in accordance with an embodiment.

FIG. 3 shows the basic chunking algorithm according to an embodiment. The chunking algorithm receives (at 250) input data, which is stored in an input storage device (e.g., ring buffer 100). The received input data is divided (at 252) into multiple segments that are assigned to respective chunking instances.

The segments are processed (at 254) by the respective chunking instances. When a chunking instance has completed processing its respective segment, the chunking instance proceeds to process (at 256) at least part of the next segment. For example, in FIG. 1, once chunking instance C1 has completed processing segment 102, chunking instance C1 proceeds to process the beginning of next segment 104. When the chunking instance proceeds to process at least part of the next segment, it attempts to synchronize with the tentative chunk list produced by the chunking instance that started with that segment.

Next, the tentative chunks that are identified by the chunking instances are harmonized (at 258), which produces an output set of chunks for the input data. The output set of chunks may include the tentative chunk list for the first chunk instance (the one corresponding to the first segment) up to its synchronization point with the second chunk instance, then the tentative chunk list for the second chunk instance starting with chunks after the synchronization point with the first chunk instance up to the synchronization point of the second chunk instance with the third chunk instance, then the tentative chunk list for the third chunk instance starting with chunks after the synchronization point with the second chunk instance up to the synchronization point of the third chunk instance with the fourth chunk instance, and so on.

In the embodiments described above in which a chunking instance proceeds to a subsequent segment after the chunking instance has finished processing its respective segment, inconsistencies in identification of chunk boundaries may occur, in which case harmonization would have to be performed to address such inconsistencies.

However, in other embodiments, a chunking instance does not proceed to a subsequent segment after the chunking instance has completed its assigned segment of the input data. In a first variation (referred to as "variant A") of the chunking technique, a chunking instance simply uses the end of its assigned segment as the end boundary of the last chunk of the segment, even if there is no landmark at the end of the segment, or even if the resulting chunk is below a predefined minimum size for chunks. In this embodiment, harmonizing inconsistencies in chunk boundaries does not have to be performed: the output set of chunks is simply the combined list of tentative chunks. However, variant A comes at the cost of producing chunks that would be different from chunks that are identified from chunking the entire input data sequentially using a single processing element. Note that one reason for storing input data as chunks is that storing duplicate data can be avoided or reduced. However, if the chunking technique produces different chunks each time for the same data, then that would result in reduced deduplication.

A second variation (variant B) according to further embodiments ends the last chunk starting in a first segment at the second (or some other predefined) tentative chunk boundary identified by the second chunking instance in the second segment, unless the resulting chunk would be too large. In other words, referring to FIG. 1, the last chunk that starts in the first input data segment 102 is set to end at the second chunk boundary xyz2 in the list 112 identified by the chunking instance C2, unless the resulting chunk would be too large, in which case variant A above is used. With variants A or B, two adjacent or overlapping chunks from different tentative sets of chunks (e.g., list 108 and list 112 in FIG. 1) can be merged into a single chunk if a size of a resulting chunk from the merging would not exceed a predetermined maximum chunk size In variants A and B above, once a chunking instance has completed its assigned input data segment, the chunking instance does not proceed to the next input data segment. However, with the variants described below, a chunking instance will proceed to process at least part of a next input data segment once the chunking instance has completed processing its assigned input data segment.

In a variant C, a timeout mechanism is used to ensure synchronization happens quickly. The timeout-enabled synchronization procedure starts when a chunking instance (e.g., C1 in FIG. 1) begins processing the next input data segment (e.g., second input data segment 104 in FIG. 1 that is assigned to chunking instance C2). When the synchronization procedure starts, a timeout counter is started. Upon timeout expiration (the timeout counter reaching a particular threshold) without synchronization already having been achieved, the first chunking instance C1 stops chunking and synchronizes using the next boundary identified by the second chunking instance C2 (e.g., the first boundary after the current position of the chunking instance C1).

For example, in FIG. 1, timeout may have expired before the chunking instance C1 reaches chunk boundary abc9. Upon timeout, the chunking instance C1 will use the next chunking instance identified by chunking instance C2 as the synchronization chunk boundary. If it is assumed for this example that the chunk boundaries are ordered . . . , xyz1, abc6, abc7, xyz2, xyz3, abc8, abc9, . . . and that C1 was between abc7 and xyz2 when the timeout occurred, then the synchronization point will be xyz2 with the chunk in the output set before the synchronization point being [abc7, xyz2] and the one after being [xyz2, xyz3].

The caveat to the above is that if the resulting chunk exceeds the maximum chunk size, then the chunk will be broken up into two below-maximum-size chunks, such as by cutting the chunk in half or otherwise dividing the chunk.

Timeouts can be based on time kept by a clock, number of CPU (central processing unit) cycles consumed by the processor core, number of chunks generated, number of bytes of input data processed, or any other suitable metric that indirectly measures time or resource consumption.

Figure 4:
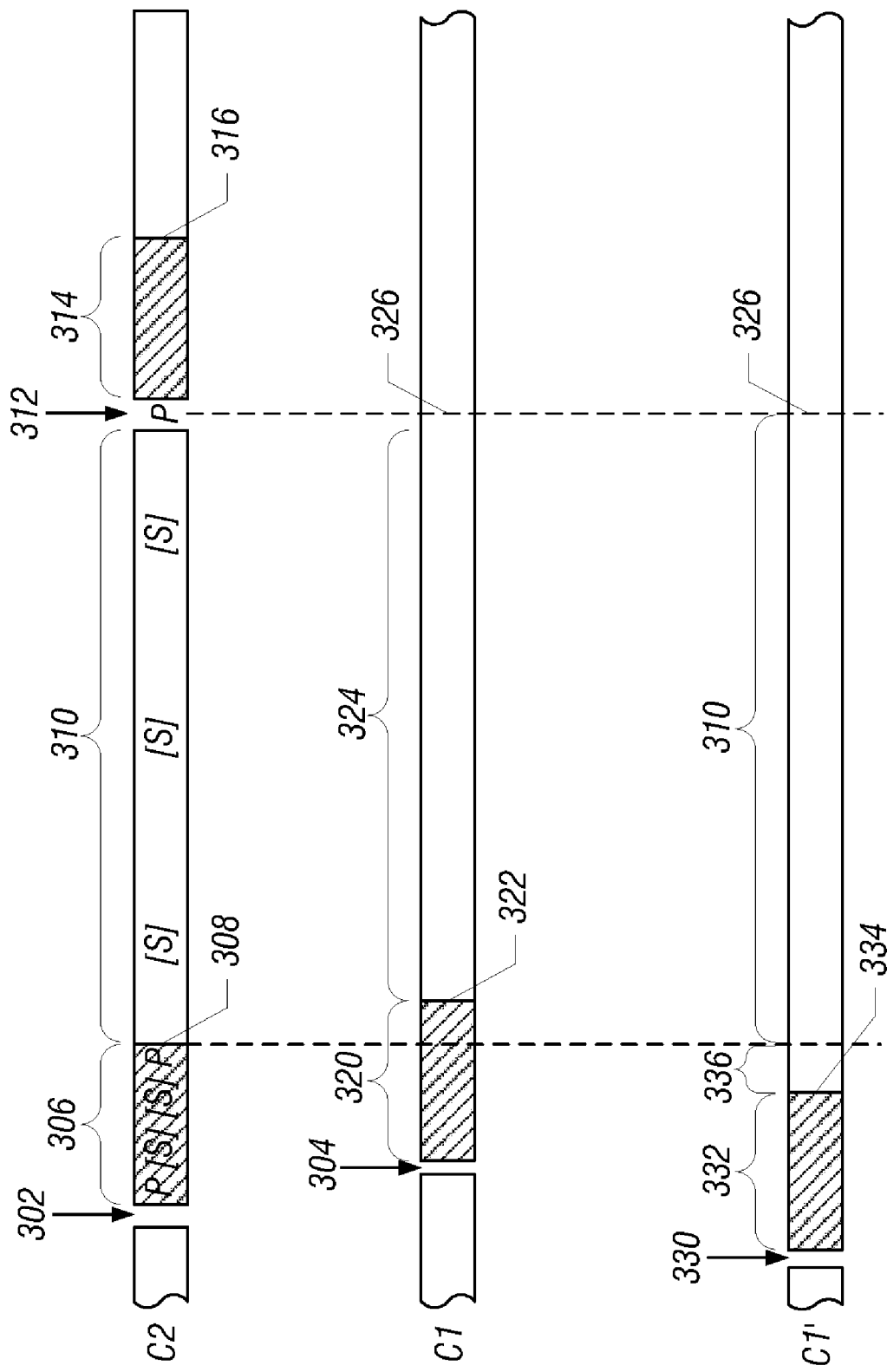
FIG. 4 illustrates a variant of an embodiment of the invention for identifying chunks in segments of input data by multiple chunking instances.

In yet another variation (variant D), the efficiency of the speed at which synchronization of chunk boundaries identified by multiple chunking instances is performed is improved by avoiding unnecessary scanning of regions of an input data that is known to have already been processed by another chunking instance. An example of variant D is depicted in FIG. 4, which shows a portion of a particular segment (e.g., segment 104) of the input data that has already been processed by C2 and is now being processed by C1 in order to achieve synchronization with C2. The first line shows the results of C2's tentative chunking of the segment. The second and third lines show different scenarios for C1 working on processing the segment.

Chunking instance C1 has finished processing its assigned segment, and has continued to process the subsequent segment (assigned to chunking instance C2). A tentative chunk boundary 302 has been identified by chunking instance C2 in the segment, and another tentative chunk boundary 304 has already been identified by chunking instance C1 in the segment under a first scenario. The chunk boundaries 302 and 304 are at different positions in the segment, which means that synchronization has not yet been achieved. A shaded region 306 following the tentative chunk boundary 302 identified by chunking instance C2 represents a region of minimum chunk size following the tentative chunk boundary 302. Any landmarks, whether primary landmarks (P) or secondary landmarks (S) within the region 306, were disregarded by C2. In fact, after finding tentative chunk boundary 302, the chunking instance C2 skipped over the region 306 and continued to process the segment starting at position 308 immediately after the region 306.

In processing the subsequent region 310 following the region 306 (where the region 310 starts at position 308), the chunking instance C2 identified several secondary landmarks (marked with S). However, in the example of FIG. 4, the chunking instance C2 also found a primary landmark (P) at the end of the region 310. It is assumed that the primary landmark P in the region 310 was found before reaching a position that corresponds to the maximum chunk size following the tentative chunk boundary 302. As a result, this primary landmark P in the region 310 was used as the next tentative chunk boundary 312 by the chunking instance C2.

Following the tentative chunk boundary 312, the chunking instance C2 again skipped over a region 314 following the tentative chunk boundary 312, where the region 314 extends from the tentative chunk boundary 312 to a position 316 that corresponds to the minimum chunk size following the tentative chunk boundary 312. The chunking instance C2 then continued processing the segment starting at the position 316.

The chunking instance C1, when processing the segment following the tentative chunk boundary 304, skips over a region 320 immediately following the tentative chunk boundary 304 identified by the chunking instance C1. The region 320 starts at the tentative chunk boundary 304 and ends at a position 322 corresponding to the minimum chunk size following the tentative chunk boundary 304. However, the chunking instance C1 knows that the chunking instance C2 has already processed a region 324 that immediately follows the position 322 until a position 326 corresponding to the tentative chunk boundary 312 found by the chunking instance C2.

As a result, the chunking instance C1 does not have to scan the region 324 again to find secondary or primary landmarks. Instead, the chunking instance C1 skips from tentative chunk boundary 304 all the way to position 326 that corresponds to the tentative chunk boundary 312 found by the chunking instance C2. The chunking instance C1 then continues to scan the segment starting at position 326 for the purpose of identifying primary and secondary landmarks, and to determine boundaries based on the identified primary and secondary landmarks.

It can safely do this if C1 found a landmark at 312 (as shown) because there cannot be a primary landmark in region 310 in this case (otherwise, C2 would have drawn the tentative chunk boundary there) and because any secondary landmark in region 310 is superseded by the landmark C2 found at 312. Note that 312 is within the maximum chunk size of C2 and so 326 must also be within the maximum chunk size of C1. If C1 did not find a landmark at 312 (not shown), then skipping region 324 is safe because it contains no landmarks (otherwise, C2 would have drawn the tentative chunk boundary there instead).

Note that if chunking instance C1 also identifies a primary landmark at position 326 (as in this example), then synchronization has occurred between chunking instances C1 and C2. However, if chunking instance C1 did not find a primary landmark at position 326, the chunking instance C1 continues processing the segment until synchronization is achieved between C1 and C2 as described above in connection with the basic algorithm.

In a variation of the example described above (the second scenario), it is assumed that chunking instance C1 (in this case labeled C1') has found a tentative chunk boundary 330 that is located before the tentative chunk boundary 302 found by C2. In the first scenario, it was assumed that the chunking instance C1 found a tentative chunk boundary 304 that is positioned after the tentative chunk boundary 302.

From the tentative chunk boundary 330, the chunking instance C1' skips over a region 330 until it reaches a position 334 that correspond to a minimum chunk size after the tentative chunk boundary 330. The chunking instance C1' in this alternative example knows that chunking instance C2 did not scan a region 336 between position 334 and position 308, since the chunking instance C2 skipped from tentative chunk boundary 302 all the way to position 308. As a result, the chunking instance C1' scans (part of) the region 336 to determine whether a tentative chunk boundary should be placed in the region 336.

If the chunking instance C1' reaches position 308 without declaring a tentative chunk boundary, the chunking instance C1' skips all the way to position 326, and resumes scanning of the segment starting from position 326.

In the examples described above, according to variant D, the chunking instance C1 or C1' is able to skip over a region 310 that has already been processed by chunking instance C2 for identifying primary or secondary landmarks. Therefore, the speed and efficiency of processing the segment by chunking instance C1 or C1' is improved since unnecessary scanning is avoided.

In yet another variation (variant E), the chunking instances used for processing a segment of input data can be optimized to perform well in landmark-free regions when synchronizing between multiple chunking instances. Note that a landmark chunking algorithm runs faster when landmarks occur frequently (and hence chunks are shorter) because a fixed amount of data immediately following a chunk boundary (in a region that corresponds to the minimum chunk size following the chunk boundary) does not have to be scanned and processed. However, in regions without landmarks, a chunking instance would have to scan all the data from just after the minimum chunk size position up to a position corresponding to the maximum chunk size from the previous chunk boundary. If scanning of such maximum size chunks occurs one after another within a segment, then the speed of processing such a segment will be reduced.

In accordance with some embodiments, when a first chunking instance synchronizes with the tentative chunk set of a second chunking instance for a given segment, the tentative chunk set of the second chunking instance is used to determine whether the segment contains a landmark-free region. The start of a landmark-free region can be identified if D consecutive tentative chunks are all maximum-length chunks, where D is a predefined parameter (e.g., 2, 3, etc.).

Thus, for example, assuming chunking instances C1 is synchronizing with the tentative chunk set of C2 for a given segment (e.g., 104 in FIG. 1, which has been assigned to chunking instance C2), the algorithm according to variant E will determine if a tentative chunk boundary identified by chunking instance C1 is contained in a tentative maximum-sized chunk produced by chunking instance C2, and whether such maximum-sized chunk produced by chunking instance C2 is followed by D or more tentative maximum-sized chunks. If so, then it is assumed by chunking instance C1 that chunking instance C1 is in a landmark-free region. In such a scenario, the chunking instance C1 will then produce a maximum-sized chunk using simple arithmetic, without scanning the landmark-free region. Additional details regarding techniques used by chunking instances to process landmark-free regions are described in U.S. Ser. No. 12/260,024, entitled "Landmark Chunking of Landmarkless Regions," filed Oct. 28, 2008.

In some embodiments, two or more of the variants described above can be combined. For example, variants C, D, and E can be combined to achieve improved chunking efficiency as performed by multiple processing elements in parallel. In other embodiments, other combinations of variants are possible.

Instructions of software described above (including chunking instances C1 to C4 of FIG. 2) are loaded for execution on respective processing elements (such as processor cores 220_1 to 220_4 in FIG. 2). A processing element includes a microprocessor, microcontroller, processor module or subsystem (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer including a plurality of processing elements, comprising:
   dividing input data into a plurality of segments;
   processing the plurality of segments, in parallel, by the processing elements in the computer, wherein processing the plurality of segments produces a plurality of tentative sets of chunks defined by respective chunk boundaries, wherein at least one of the plurality of tentative sets includes a chunk defined by a particular chunk boundary that would not have been identified as a chunk boundary if the input data were sequentially processed by a single one of the processing elements; and
   stitching the plurality of tentative sets of chunks together to produce an output set of chunks, wherein the stitching comprises:
      creating a combined set of chunks by combining the plurality of tentative sets of chunks; and
      merging two adjacent or overlapping chunks from different tentative sets of chunks into a single chunk if a size of a resulting chunk from the merging would not exceed a predetermined maximum chunk size.

2. The method of claim 1, further comprising:
   each of the processing elements using an end of the corresponding segment as a chunk boundary.

3. The method of claim 1, further comprising:
   detecting a start of a region of one of the segments that is a landmark-free region; and
   in response to detecting the start of such landmark-free region, using a specialized algorithm to process the landmark-free region.

4. A method executed by a computer including a plurality of processing elements, comprising:
   dividing input data into a plurality of segments;
   processing the plurality of segments, in parallel, by the processing elements in the computer, wherein processing the plurality of segments produces a plurality of tentative sets of chunks; and
   stitching the plurality of tentative sets of chunks together to produce an output set of chunks, wherein the stitching comprises:
      extending a first of the tentative sets of chunks until the first tentative set of chunks reaches a synchronization point with respect to a second of the tentative sets, wherein the extended first tentative set of chunks is based on at least first and second ones of the plurality of segments, wherein the second tentative set is based on at least the second segment, and wherein stitching the plurality of tentative sets of chunks further comprises removing inconsistencies in chunks identified by the extended first tentative set and the second tentative set.

5. The method of claim 4, further comprising a first of the plurality of processing elements processing the first segment, and a second of the plurality of processing elements processing the second segment, wherein extending the first tentative set of chunks comprises the first processing element further processing at least part of the second segment.

6. The method of claim 4, further comprising a first of the plurality of processing elements processing the first segment, and a second of the plurality of processing elements processing the second segment without using information from the first segment, wherein extending the first tentative set of chunks comprises one of the plurality of processing elements processing at least part of the second segment using information from the first segment.

7. The method of claim 4, wherein the synchronization point is a point that is a chunk boundary of a chunk contained in the extended first tentative set of chunks and of a chunk contained in the second tentative set.

8. The method of claim 7, wherein extending the first tentative set further comprises:
providing a timeout counter; and
upon expiration of the timeout counter, if a synchronization point has not been reached yet, using the next boundary identified in the second tentative set as the synchronization point.

9. The method of claim 4, wherein stitching the tentative sets of chunks together further comprises choosing which chunks of the extended first tentative set and the second tentative set to include in the output set of chunks based on their relation to the synchronization point.

10. The method of claim 2, further comprising using information of the second tentative set when finding chunk boundaries during processing to extend the first tentative set.

11. The method of claim 4, further comprising:
each of the processing elements using an end of the corresponding segment as a chunk boundary.

12. The method of claim 4, further comprising:
detecting a start of a region of one of the segments that is a landmark-free region; and
in response to detecting the start of such landmark-free region, using a specialized algorithm to process the landmark-free region.

13. A computer comprising:
a storage device to store input data; and
a plurality of processing elements to:
process segments of the input data to identify tentative chunk boundaries, wherein the processing produces at least a first tentative set of chunks defined by a first group of the tentative chunk boundaries that is based on a first one of the segments, and a second tentative set of chunks defined by a second group of the tentative chunk boundaries that is based on a second one of the segments;
extend the first tentative set until synchronization occurs, wherein the synchronization comprises identifying a point that is a chunk boundary of a chunk contained in the extended first tentative set and of a chunk contained in the second tentative set, wherein the extended first tentative set of chunks is based on at least the first and second segments; and
select a set of the chunking boundaries identified by the extended first tentative set or the second tentative set to provide as part of an output set of chunking boundaries, wherein the selecting comprises removing inconsistencies in chunks identified by the extended first tentative set and the second tentative set.

14. The computer of claim 13, wherein the processing elements are to further:
detect a start of a region of one of the segments that is a landmark-free region; and
in response to detecting the start of such landmark-free region, use a specialized algorithm to process the landmark-free region.

15. The computer of claim 13, wherein the second tentative set includes a chunk defined by a particular chunk boundary that would not have been identified as a chunk boundary if the input data were sequentially processed by a single one of the processing elements.

16. An article comprising at least one non-transitory computer-readable storage medium storing instructions that when executed cause a computer to:
process segments, by a plurality of processing elements in parallel, of input data to identify chunk boundaries defining respective chunks, wherein the processing produces at least a first tentative set of the chunks that is based on at least first and second ones of the segments, and a second tentative set of the chunks that is based on at least the second segment, and wherein the processing comprises extending the first tentative set until the first tentative set reaches a synchronization point with respect to the second tentative set; and
stitch at least the first and second tentative sets of chunks together to produce an output set of chunks, wherein the stitching comprises performing harmonization to resolve inconsistencies in the chunk boundaries identified by the first and second tentative sets.

17. The article of claim 16, wherein the processing comprises identifying the synchronization point as a first common chunking boundary in the second segment that will be part of each of the first and second tentative sets.

18. The article of claim 16, wherein the processing to produce at least the first tentative set of chunks that is based on at least the first and second ones of the segments comprises using a timeout counter.

19. The article of claim 16, wherein the second tentative set includes a chunk defined by a particular chunk boundary that would not have been identified as a chunk boundary if the input data were sequentially processed by a single one of the processing elements.

* * * * *

UNITED STATES PATENT AND TRADEMARK OFFICE
CERTIFICATE OF CORRECTION

| | | |
|---|---|---|
| PATENT NO. | : 7,979,491 B2 | Page 1 of 1 |
| APPLICATION NO. | : 12/412821 | |
| DATED | : July 12, 2011 | |
| INVENTOR(S) | : Mark David Lillibridge et al. | |

It is certified that error appears in the above-identified patent and that said Letters Patent is hereby corrected as shown below:

In column 15, line 31, in Claim 10, delete "claim 2," and insert -- claim 4, --, therefor.

Signed and Sealed this
Twentieth Day of March, 2012

David J. Kappos
*Director of the United States Patent and Trademark Office*